United States Patent
Kiuchi et al.

(10) Patent No.: US 12,154,070 B2
(45) Date of Patent: Nov. 26, 2024

(54) PROCUREMENT WORK ASSISTANCE SYSTEM, PROCUREMENT WORK ASSISTANCE DEVICE, AND PROCUREMENT WORK ASSISTANCE METHOD

(71) Applicant: Hitachi, Ltd., Tokyo (JP)

(72) Inventors: Atsuki Kiuchi, Tokyo (JP); Tazu Nomoto, Tokyo (JP); Yasuo Bakke, Tokyo (JP)

(73) Assignee: HITACHI, LTD., Tokyo (JP)

( * ) Notice: Subject to any disclaimer, the term of this patent is extended or adjusted under 35 U.S.C. 154(b) by 259 days.

(21) Appl. No.: 17/641,517

(22) PCT Filed: Sep. 14, 2020

(86) PCT No.: PCT/JP2020/034654
§ 371 (c)(1),
(2) Date: Mar. 9, 2022

(87) PCT Pub. No.: WO2021/161568
PCT Pub. Date: Aug. 19, 2021

(65) Prior Publication Data
US 2022/0335370 A1     Oct. 20, 2022

(30) Foreign Application Priority Data
Feb. 12, 2020  (JP) .................................. 2020-021450

(51) Int. Cl.
*G06Q 10/00*     (2023.01)
*G06Q 10/083*    (2023.01)
(Continued)

(52) U.S. Cl.
CPC ..... *G06Q 10/087* (2013.01); *G06Q 10/08345* (2013.01); *G06Q 10/08355* (2013.01); *G06Q 10/0838* (2013.01)

(58) Field of Classification Search
CPC .......... G06Q 10/087; G06Q 10/08345; G06Q 10/08355
See application file for complete search history.

(56) References Cited

U.S. PATENT DOCUMENTS

2020/0210922 A1* 7/2020 Devarakonda ......... G06Q 10/08

FOREIGN PATENT DOCUMENTS

| JP | 2002007764 A | 1/2002 |
| JP | 2003316969 A | 11/2003 |

(Continued)

OTHER PUBLICATIONS

International Search Report PCT/JP2020/034654 Dec. 8, 2020.
Chinese Office Action received in corresponding Chinese Application No. 202080060886.2 dated Sep. 24, 2024.

*Primary Examiner* — Rokib Masud
(74) *Attorney, Agent, or Firm* — MATTINGLY & MALUR, PC

(57) ABSTRACT

A procurement work assistance device includes a storage unit configured to store order history information, delivery history information, and a procurement plan in which an item to be procured is registered, a delivery expectation index calculation unit configured to calculate, by using the order history information, a delivery expectation index indicating easiness of delivery for each item of each supplier, and an order plan formulation unit configured to generate delivery expectation index histogram information indicating a relationship between the delivery expectation index and a delivery rate calculated based on the delivery history information, calculate a delivery expectation index of the item in the procurement plan, determine, by using the delivery expectation index histogram information, the supplier having the highest delivery rate associated with the delivery expectation index, and generate order plan information (Continued)

including the item in the procurement plan and the determined supplier.

9 Claims, 16 Drawing Sheets

(51) Int. Cl.
  *G06Q 10/0834* (2023.01)
  *G06Q 10/0835* (2023.01)
  *G06Q 10/087* (2023.01)

(56) References Cited

FOREIGN PATENT DOCUMENTS

| | | | |
|---|---|---|---|
| JP | 2005-122581 | A | 5/2005 |
| JP | 2008-047117 | A | 2/2008 |
| JP | 2011150557 | A | 8/2011 |
| JP | 20191355730 | A | 8/2019 |
| WO | 2014174558 | A1 | 10/2014 |
| WO | WO-2021157412 | A1 * | 8/2021 |

* cited by examiner

FIG. 2

SUPPLIER MASTER INFORMATION 121

| SUPPLIER ID | SUPPLIER NAME | ITEM ID | ITEM NAME | PROCUREMENT LT | LOT SIZE |
|---|---|---|---|---|---|
| SUP001 | A KOGYO | ITM-A | XX SUBSTRATE | 30 DAYS | 1 |
| SUP001 | A KOGYO | ITM-B | YY SUBSTRATE | 60 DAYS | 1 |
| SUP001 | A KOGYO | ITM-C | ZZ SUBSTRATE | 45 DAYS | 1 |
| ... | ... | ... | ... | ... | ... |
| SUP001 | A KOGYO | ITM-X | JJ SUBSTRATE | 80 DAYS | 5 |
| SUP002 | B SEIKO | ITM-A | XX CASE | 7 DAYS | 5 |
| ... | ... | ... | ... | ... | ... |

FIG. 3

ORDER HISTORY INFORMATION 122

| ORDER DATE | ORDER ID | SUPPLIER ID | ITEM ID | REQUESTED DELIVERY DEADLINE | ORDER QUANTITY |
|---|---|---|---|---|---|
| 2018/1/5 | P000 | SUP001 | ITM-A | 2018/3/10 | 50 |
| 2018/3/1 | P001 | SUP001 | ITM-A | 2018/6/10 | 10 |
| 2018/3/1 | P002 | SUP001 | ITM-A | 2018/6/15 | 20 |
| 2018/3/1 | P003 | SUP002 | ITM-B | 2018/6/1 | 30 |
| 2018/3/1 | P004 | SUP002 | ITM-B | 2018/6/4 | 15 |
| ... | ... | ... | ... | ... | |
| 2018/3/1 | P110 | SUP002 | ITM-A | 2018/6/20 | 100 |
| ... | ... | ... | ... | ... | |

FIG. 4

DELIVERY HISTORY INFORMATION 123

| DELIVERY ID | ORDER ID | SUPPLIER ID | ITEM ID | REQUESTED DELIVERY DEADLINE | DELIVERY DATE | ORDER QUANTITY | DELIVERY QUANTITY |
|---|---|---|---|---|---|---|---|
| A001 | P001 | SUP001 | ITM-A | 2018/6/10 | 2018/6/10 | 10 | 3 |
| A002 | P001 | SUP001 | ITM-A | 2018/6/10 | 2018/6/16 | 10 | 7 |
| A003 | P003 | SUP002 | ITM-B | 2018/6/1 | 2018/6/1 | 30 | 30 |
| A004 | P004 | SUP002 | ITM-B | 2018/6/4 | 2018/6/4 | 15 | 15 |
| ... | ... | ... | ... | ... | ... | | |
| P001 | P110 | SUP002 | ITM-A | 2018/6/20 | 2018/6/20 | 100 | 100 |
| ... | ... | ... | ... | ... | ... | | |

DELIVERY EXPECTATION INDEX INFORMATION 124

| ORDER ID | DELIVERY EXPECTATION INDEX | DELIVERY RATE |
|---|---|---|
| P001 | -360 | 30 |
| P*** | -230 | 60 |
| P*** | -170 | 80 |
| P*** | 80 | 40 |
| P*** | 120 | 30 |
| P002 | 200 | 20 |
| P*** | 360 | 30 |
| P*** | 450 | 15 |
| P100 | -320 | 40 |
| P*** | 110 | 45 |
| P120 | -335 | 50 |
| ... | ... | ... |

FIG. 6

DELIVERY EXPECTATION INDEX HISTOGRAM INFORMATION 125

| ITEM ID | SUPPLIER ID | DELIVERY EXPECTATION INDEX LOWER LIMIT | DELIVERY EXPECTATION INDEX UPPER LIMIT | FREQUENCY | AVERAGE DELIVERY RATE |
|---|---|---|---|---|---|
| ITM-A | SUP001 | -399 | -300 | 3 | 60 |
| ITM-A | SUP001 | -299 | -200 | 5 | 70 |
| ITM-A | SUP001 | -199 | -100 | 8 | 80 |
| ITM-A | SUP001 | -99 | 0 | 2 | 30 |
| ITM-A | SUP001 | 1 | 100 | 15 | 35 |
| ITM-A | SUP001 | 101 | 200 | 5 | 20 |
| ITM-A | SUP001 | 201 | 300 | 10 | 30 |
| ... | ... | ... | | ... | |

FIG. 7

PROCUREMENT PLAN INFORMATION 126

| ITEM ID | REQUIRED DATE | QUANTITY |
|---|---|---|
| ITM-A | 2018/7/10 | 70 |
| ITM-B | 2018/7/10 | 75 |
| ITM-C | 2018/7/1 | 65 |
| ITM-D | 2018/7/4 | 50 |
| ... | ... | ... |
| ITM-X | 2018/7/20 | 83 |
| ... | ... | ... |

FIG. 8

ORDER PLAN INFORMATION 127

| SUPPLIER ID | ITEM ID | REQUESTED DELIVERY DEADLINE | QUANTITY | AVERAGE DELIVERY RATE |
|---|---|---|---|---|
| SUP001 | ITM-A | 2018/7/10 | 100 | 75% |
| SUP001 | ITM-A | 2018/7/10 | 200 | 85% |
| SUP002 | ITM-A | 2018/7/1 | 300 | 60% |
| SUP002 | ITM-A | 2018/7/4 | 400 | 92% |
| ... | ... | ... | ... | ... |
| SUP002 | ITM-X | 2018/7/20 | 1100 | 95% |
| ... | ... | ... | ... | ... |

DELIVERY EXPECTATION INDEX HISTOGRAM

FIG. 11

[ORDER PLAN CONFIRMATION SCREEN]

SUPPLIER: X COMPANY ▽

Tabs: ITEM A | ITEM B | ITEM C

| | RECOMMENDED PLAN | | | |
|---|---|---|---|---|
| ESTIMATED DELIVERY DEADLINE COMPLIANCE RATE (OVERALL) | 91.6% | | | |
| RECOMMENDED ORDER INFORMATION | RECOMMENDED ORDER DATE | REQUESTED DELIVERY DEADLINE | QUANTITY | ESTIMATED DELIVERY DEADLINE COMPLIANCE RATE |
| | 2019/8/1 | 2019/9/1 | 120 | 85% |
| | 2019/8/7 | 2019/9/7 | 150 | 90% |
| | 2019/8/14 | 2019/9/14 | 200 | 100% |

FIG. 13

WORK LOGIC INFORMATION 128

| WORK LOGIC ID (128a) | LOGIC NAME (128b) | USE FLAG (128c) |
|---|---|---|
| L001 | PERIODIC ORDERING METHOD | 1 |
| L002 | FIXED QUANTITY ORDERING METHOD | 0 |
| L003 | FIXED QUANTITY MAINTAINING METHOD | 0 |
| ... | ... | |

PROCUREMENT WORK ASSISTANCE SYSTEM, PROCUREMENT WORK ASSISTANCE DEVICE, AND PROCUREMENT WORK ASSISTANCE METHOD

TECHNICAL FIELD

The present invention relates to a procurement work assistance system, a procurement work assistance device, and a procurement work assistance method. The present invention claims priority to Japanese Patent Application No. 2020-021450, filed on Feb. 12, 2020, the contents of which are incorporated by reference herein in its entirety in designated states where the incorporation of documents by reference is approved.

BACKGROUND ART

PTL 1 describes that "monitoring of production capacity for a plurality of suppliers is performed by receiving performance data of at least one of the plurality of suppliers, receiving forecast data of a manufacturer, and generating a production capacity risk evaluation, based on the received performance data and the received forecast data" with regard to a method for monitoring production capacity of a supplier.

CITATION LIST

Patent Literature

PTL 1: JP 2008-47117 A

SUMMARY OF INVENTION

Technical Problem

In procurement work, an order plan including, as data, an order destination supplier, an ordered item, a delivery deadline, and a quantity is created based on a procurement plan indicating a required date and a necessary quantity for each item from a production plan, a stock plan, or the like. At this time, it is desired to place an order at the earliest possible time, based on a future procurement plan, in order to ensure delivery from a supplier. However, since a procurement plan changes every moment due to a demand fluctuation in a supply chain, an order placed at an early time may be a cause resulting in overstocking and stockout.

On the other hand, when an order based on a procurement plan near a period until a required date is placed in order to follow a demand fluctuation, a preparation period for a supplier is shortened to increase a probability that a delivery delay occurs, which may be a factor resulting in stockout. In other words, in order to achieve both following of a demand fluctuation and a stock reduction (or avoidance of stockout), order work in consideration of both a delivery deadline compliance rate and procurement on a short delivery deadline of a supplier is required.

Here, PTL 1 discloses the technique for monitoring production capacity of a supplier. However, in the technique of PTL 1, consideration of both a delivery deadline compliance rate and procurement on a short delivery deadline of a supplier is not described.

The present invention has been made in view of the problem described above, and an object is to provide a procurement work assistance system capable of formulating an order plan including an optimum supplier that satisfies a procurement plan.

Solution to Problem

The present application includes a plurality of solutions to at least a part of the problems described above. One example of the solutions is as follows. A procurement work assistance system according to one aspect of the present invention that solves the problem described above is a procurement work assistance system including: a procurement work assistance device; and a user terminal device, wherein the procurement work assistance device includes a storage unit configured to store order history information in which a past order history is registered, delivery history information in which a past delivery history is registered, and a procurement plan in which an item to be procured is registered, a delivery expectation index calculation unit configured to calculate, by using the order history information, a delivery expectation index indicating easiness of delivery for each item of each supplier, an order plan formulation unit configured to generate delivery expectation index histogram information indicating a relationship between the delivery expectation index and a delivery rate calculated based on the delivery history information, calculate a delivery expectation index of the item in the procurement plan, determine, by using the delivery expectation index histogram information, the supplier having the highest delivery rate associated with the delivery expectation index, and generate order plan information including the item in the procurement plan and the determined supplier, and a communication unit configured to transmit predetermined screen information to the user terminal device, and the user terminal device includes a display unit configured to display the screen information.

Advantageous Effects of Invention

A procurement work assistance system according to the present invention can formulate an order plan including an optimum supplier that satisfies a procurement plan.

BRIEF DESCRIPTION OF DRAWINGS

FIG. 2 is a view illustrating an example of a data configuration of supplier master information.

FIG. 3 is a view illustrating an example of a data configuration of order history information.

FIG. 4 is a view illustrating an example of a data configuration of delivery history information.

FIG. 5 is information illustrating an example of a data configuration of delivery expectation index information.

FIG. 6 is information illustrating an example of a data configuration of delivery expectation index histogram information.

FIG. 7 is a view illustrating an example of a data configuration of procurement plan information.

FIG. 8 is a view illustrating an example of a data configuration of order plan information.

FIG. 11 is a view illustrating an example of an order plan confirmation screen displayed on a user terminal device.

FIG. 13 is a view illustrating an example of a data configuration of work logic information.

DESCRIPTION OF EMBODIMENTS

Each embodiment of the present invention will be described below by using the drawings.

First Embodiment

Figure 1:
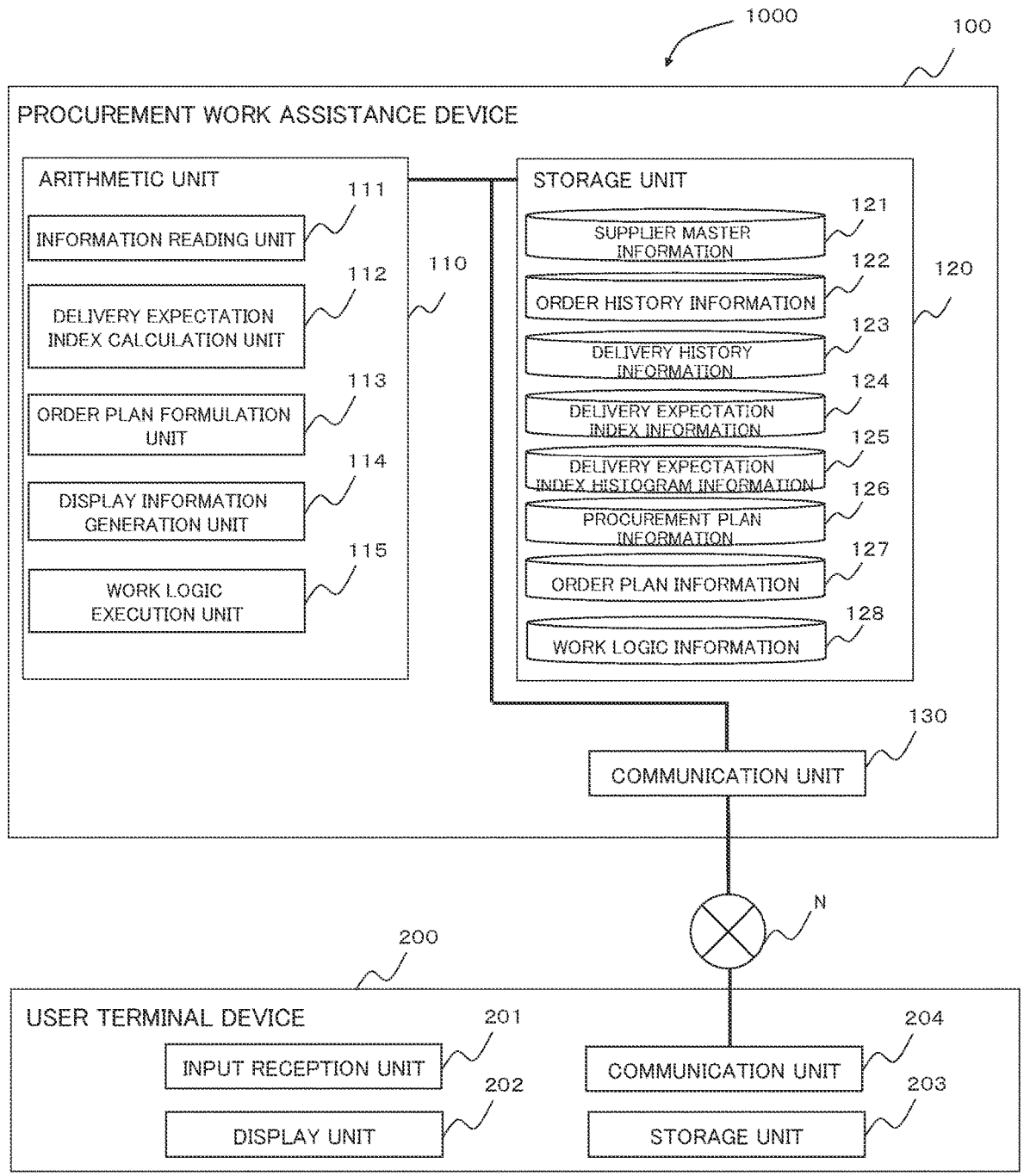
FIG. 1 is a view illustrating an example of a schematic configuration of a procurement work assistance system according to a first embodiment.

FIG. 1 is a view illustrating an example of a schematic configuration of a procurement work assistance system 1000 according to the present embodiment. The procurement work assistance system 1000 includes a procurement work assistance device 100 and a user terminal device 200. The procurement work assistance device 100 and the user terminal device 200 are communicably connected to each other via a network N. Note that the network N is, for example, a public network such as the Internet, a local area network (LAN), a wide area network (WAN), or the like.

The procurement work assistance device 100 is a device that performs various types of arithmetic processing related to procurement work. Specifically, the procurement work assistance device 100 generates various types information used for the procurement work, such as index information indicating easiness of delivery (i.e., ease of delivery or ease of an order) and histogram information using the index information.

Specifically, the procurement work assistance device 100 includes an arithmetic unit 110, a storage unit 120, and a communication unit 130. The arithmetic unit 110 includes an information reading unit 111, a delivery expectation index calculation unit 112, an order plan formulation unit 113, a display information generation unit 114, and a work logic execution unit 115. Note that, since the work logic execution unit 115 is one of functional units in a procurement work assistance device 100 according to a second embodiment described below, detailed description will be omitted in the present embodiment.

The information reading unit 111 is a functional unit that reads information stored in the storage unit 120. Specifically, the information reading unit 111 performs processing of reading, from the storage unit 120, various types of information needed to perform processing by the arithmetic unit 110.

The delivery expectation index calculation unit 112 is a functional unit that calculates a delivery expectation index. Specifically, the delivery expectation index calculation unit 112 calculates a delivery expectation index indicating easiness of delivery by using predetermined information (for example, supplier master information 121 described below, and the like) stored in the storage unit 120, and generates delivery expectation index information in which a value of the calculated delivery expectation index is registered.

Note that easiness of delivery indicates whether it is easy to deliver an item in ordered quantity on a requested delivery deadline, and a value of a delivery expectation index is a value calculated with, as elements, a margin of days (an interval between days) between an order date and a requested delivery deadline, and a change amount from a previous order quantity to a current order quantity.

The order plan formulation unit 113 is a functional unit that formulates an order plan. Specifically, the order plan formulation unit 113 generates order plan information by using predetermined information (for example, delivery expectation index histogram information and procurement plan information described below). More specifically, the order plan formulation unit 113 generates the delivery expectation index histogram information by using the delivery expectation index information generated by the delivery expectation index calculation unit 112, and the like. The order plan formulation unit 113 calculates a delivery expectation index for each item related to a procurement plan, and determines a supplier having a higher delivery rate (being more likely to comply with delivery) according to a range of a delivery expectation index histogram including a value of the calculated delivery expectation index. The order plan formulation unit 113 generates the order plan information including predetermined information such as a determined supplier and an ordered item.

The display information generation unit 114 is a functional unit that generates screen information to be displayed on a display device. Specifically, the display information generation unit 114 generates screen information about an order plan confirmation screen to be displayed on a display device of the user terminal device 200.

The storage unit 120 is a functional unit that stores various types of information. Specifically, the storage unit 120 includes the supplier master information 121, order history information 122, delivery history information 123, and procurement plan information 126. The storage unit 120 stores delivery expectation index information 124 generated by the delivery expectation index calculation unit 112. The storage unit 120 stores delivery expectation index histogram information 125 and order plan information 127 that are generated by the order plan formulation unit 113. Note that the storage unit 120 stores work logic information 128, but the information is information used by the work logic execution unit 115 of the procurement work assistance device 100 according to the second embodiment described below, and thus detailed description will be omitted in the present embodiment.

FIG. 2 is a view illustrating an example of a data configuration of the supplier master information 121. The supplier master information 121 is information related to a supplier and an item handled by a supplier. As illustrated, the supplier master information 121 includes a record in which a supplier ID 121*a*, a supplier name 121*b*, an item ID 121*c*, an item name 121*d*, a procurement lead time (LT) 121*e*, and a lot size 121*f* are associated with one another.

The supplier ID 121*a* is information that uniquely identifies each supplier. The supplier name 121*b* is information indicating a name of a supplier. The item ID 121*c* is information that uniquely identifies an item to be a procurement target. The item name 121*d* is information indicating a name of an item. The procurement lead time (LT) 121*e* is information indicating a time from an order of a corresponding item to delivery. The lot size 121*f* is information indicating a minimum order unit of a corresponding item.

FIG. 3 is a view illustrating an example of a data configuration of the order history information 122. The order history information 122 is information related to a supplier and an item that have been ordered in the past by a procurement source company. As illustrated, the order history information 122 includes a record in which an order date 122a, an order ID 122b, a supplier ID 122c, an item ID 122d, a requested delivery deadline 122e, and an order quantity 122f are associated with one another.

The order date 122a is information indicating a date on which a corresponding item is ordered to a supplier. The order ID 122b is information that uniquely identifies an order content. The supplier ID 122c and the item ID 122d are pieces of information common to the supplier ID 121a and the item ID 121c of the supplier master information 121, respectively. The requested delivery deadline 122e is information indicating a requested delivery deadline of a corresponding item for a supplier. The order quantity 122f is information indicating the ordered quantity of corresponding item.

FIG. 4 is a view illustrating an example of a data configuration of the delivery history information 123. The delivery history information 123 is information indicating a delivery history of an ordered item. As illustrated, the delivery history information 123 includes a record in which a delivery ID 123a, an order ID 123b, a supplier ID 123c, an item ID 123d, a requested delivery deadline 123e, a delivery date 123f, an order quantity 123g, and a delivery quantity 123h are associated with one another.

The delivery ID 123a is information that uniquely identifies a delivery content. The order ID 123b, the supplier ID 123c, and the item ID 123d are pieces of information common to the order ID 122b, the supplier ID 122c, and the item ID 122d of the order history information 122, respectively. The requested delivery deadline 123e and the order quantity 123g are pieces of information common to the requested delivery deadline 122e and the order quantity 122f of the order history information 122, respectively. The delivery date 123f is information indicating a date on which a corresponding item is delivered from a supplier. The delivery quantity 123h is information indicating an actual delivered quantity of a corresponding item. Note that, even when delivery is performed before a requested delivery deadline, it is assumed that the same date as the requested delivery deadline is registered as a delivery date. In other words, even when a requested delivery deadline is "2018 Jun. 10" and an actual delivery date is "2018 Jun. 8", for example, it is assumed that a date of "2018 Jun. 10" being the same date as the requested delivery deadline is registered as a delivery date.

FIG. 5 is information illustrating an example of a data configuration of the delivery expectation index information 124. The delivery expectation index information 124 is information including an index indicating easiness of delivery. As illustrated, the delivery expectation index information 124 includes a record in which an order ID 124a, a delivery expectation index 124b, and a delivery rate 124c are associated with one another. Note that the delivery expectation index information 124 is generated for each combination of a supplier and an item that are determined by an order ID.

The order ID 124a is information common to the order ID 122b of the order history information 122. The delivery expectation index 124b is information indicating easiness of delivery. In the example, a greater value of a delivery expectation index indicates greater easiness of delivery for a combination of a supplier and an item that are determined by a corresponding order ID. The delivery rate 124c is information indicating a proportion of a delivery quantity delivered on a requested delivery deadline to an order quantity.

Note that the delivery expectation index information 124 is generated by the delivery expectation index calculation unit 112.

FIG. 6 is information illustrating an example of a data configuration of the delivery expectation index histogram information 125. The delivery expectation index histogram information 125 is information used for generating a delivery expectation index histogram. As illustrated, the delivery expectation index histogram information 125 includes a record in which an item ID 125a, a supplier ID 125b, a delivery expectation index lower limit 125c, a delivery expectation index upper limit 125d, a frequency 125e, and an average delivery rate 125f are associated with one another.

The item ID 125a and the supplier ID 125b are pieces of information common to the item ID 121c and the supplier ID 121a of the supplier master information 121, respectively. The delivery expectation index lower limit 125c and the delivery expectation index upper limit 125d are pieces of information respectively indicating an upper limit and a lower limit of each range when a range that a delivery expectation index may take is divided by a predetermined range width (for example, by a width of 100). The frequency 125e is information indicating the number of the order ID 124a in the delivery expectation index information 124 being associated with a delivery expectation index included in a corresponding range width. The average delivery rate 125f is information indicating an average value of the delivery rate 124c in the delivery expectation index information 124 being associated with a delivery expectation index included in a corresponding range width.

Note that the delivery expectation index histogram information 125 is generated by the order plan formulation unit 113.

FIG. 7 is a view illustrating an example of a data configuration of the procurement plan information 126. The procurement plan information 126 is information related to an item to be procured. Specifically, the procurement plan information 126 includes a record in which an item ID 126a, a required date 126b, and a quantity 126c are associated with one another.

The item ID 126a is information common to the item ID 121c of the supplier master information 121. The required date 126b is information indicating a procurement due date, i.e., a requested delivery deadline of a corresponding item. The quantity 126c is information indicating a procurement quantity of a corresponding item.

FIG. 8 is a view illustrating an example of a data configuration of the order plan information 127. The order plan information 127 is information related to an order plan of a procurement item. As illustrated, the order plan information 127 includes a record in which a supplier ID 127a, an item ID 127b, a requested delivery deadline 127c, a quantity 127d, and an average delivery rate 127e are associated with one another.

The supplier ID 127a and the item ID 127d are pieces of information common to the supplier ID 121a and the item ID 121c of the supplier master information 121, respectively. The requested delivery deadline 127c is information common to the requested delivery deadline 122e of the order history information 122, and corresponds to the required date 126b of the procurement plan information 126. The quantity 127d is information common to the quantity 126c of the procurement plan information 126. The average delivery rate 127e is information indicating an average delivery rate of a corresponding supplier and a corresponding item.

Referring back to FIG. 1, description is given. The communication unit 130 is a functional unit that performs information communication with an external device. Specifically, for example, the communication unit 130 acquires, from the user terminal device 200, an instruction to generate the order plan information 127, a display request for an order plan confirmation screen, and the like. The communication unit 130 transmits screen information about an order plan confirmation screen to the user terminal device 200.

The functional configuration of the procurement work assistance device 100 has been described above.

Next, an example of a functional configuration of the user terminal device 200 will be described by using FIG. 1. The user terminal device 200 is a device used for procurement work. For example, the user terminal device 200 instructs the procurement work assistance device 100 to perform processing of generating an order plan, and displays information related to an order plan generated by the procurement work assistance device 100.

As illustrated in FIG. 1, the user terminal device 200 includes an input reception unit 201, a display unit 202, a storage unit 203, and a communication unit 204.

The input reception unit 201 is a functional unit that receives, from a user, an instruction to generate the order plan information 127, a display request for an order plan confirmation screen, and the like.

The display unit 202 is a functional unit that displays screen information on the display device included in the user terminal device 200. For example, the display unit 202 generates screen information for receiving an instruction to generate the order plan information 127 from a user, and displays the screen information on the display device. The display unit 202 displays, on the display device, screen information about an order plan confirmation screen acquired from the procurement work assistance device 100.

The storage unit 203 is a functional unit that stores predetermined information related to processing of the user terminal device 200.

The communication unit 204 is a functional unit that performs information communication with an external device. Specifically, the communication unit 204 transmits an instruction to generate the order plan information 127 to the procurement work assistance device 100. The communication unit 204 acquires screen information about an order plan confirmation screen from the procurement work assistance device 100.

The functional configuration of the user terminal device 200 has been described above.

[Description of Operation]

Next, order plan generation processing performed by the procurement work assistance device 100 will be described.

Figure 9:
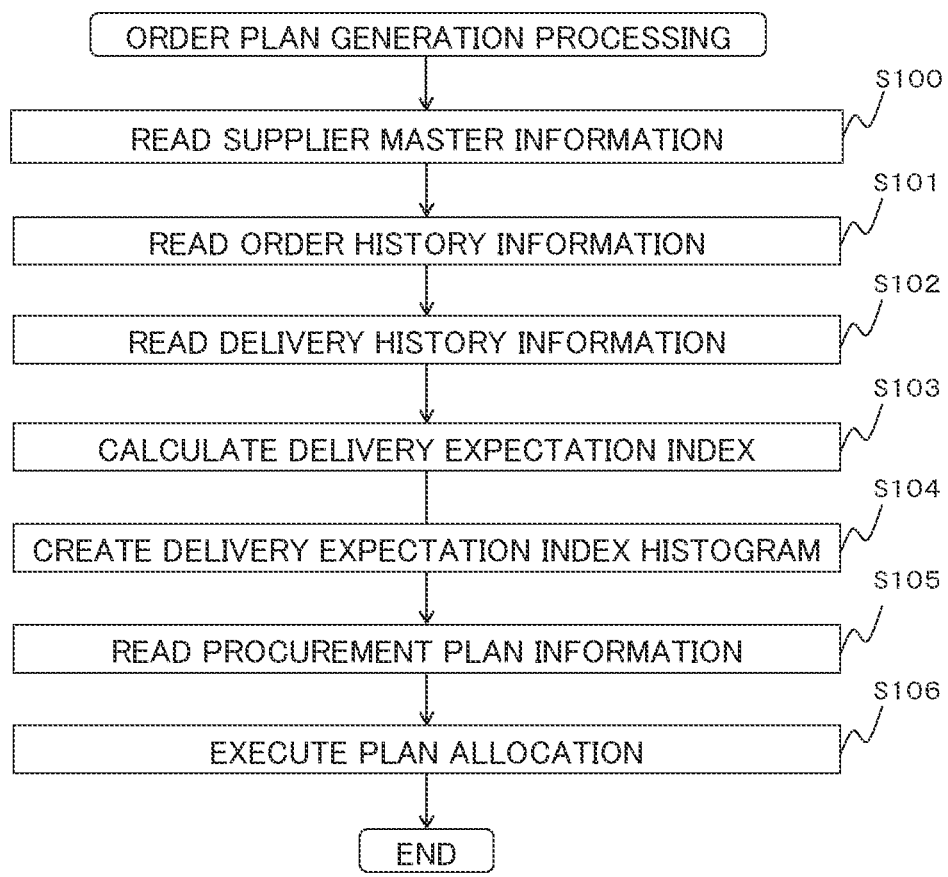
FIG. 9 is a flowchart illustrating an example of order plan generation processing.

FIG. 9 is a flow diagram illustrating an example of the order plan generation processing. The processing is performed by the procurement work assistance device 100 that acquires an instruction to generate the order plan information 127 from the user terminal device 200, for example.

When the processing starts, the information reading unit 111 reads, from the storage unit 120, various types of information needed to generate an order plan in the processing in step S100 to step S102. Specifically, the information reading unit 111 reads the supplier master information 121 in the processing in step S100, reads the order history information 122 in the processing in step S101, and reads the delivery history information 123 in the processing in step S102.

Next, the delivery expectation index calculation unit 112 calculates a delivery expectation index (step S103). Specifically, the delivery expectation index calculation unit 112 calculates a delivery expectation index for each order in a combination of the same supplier and the same item by using the supplier master information 121, the order history information 122, and the delivery history information 123 that are read by the information reading unit 111.

More specifically, the delivery expectation index calculation unit 112 calculates a delivery expectation index by a predetermined arithmetic expression using an interval index indicating a margin degree of a period from an order to a requested delivery deadline and a quantity ratio index indicating a proportion of a change amount from a latest previous order quantity to a current order quantity.

Hereinafter, calculation of a delivery expectation index will be described by taking, as an example, an order ID "P001" in a combination of a supplier "SUP001" and an item "ITM-A".

First, the delivery expectation index calculation unit 112 calculates an interval index. Specifically, the delivery expectation index calculation unit 112 calculates the number of days "102 days" acquired by subtracting an order date "2018 Mar. 1" from a requested delivery deadline "2018 Jun. 10" of a record 122g in which the order ID "P001", the supplier "SUP001", and the item "ITM-A" are associated with one another in the order history information 122.

Next, the delivery expectation index calculation unit 112 calculates the number of days acquired by subtracting a lead time of the item from the calculated number of days. Since a procurement LT of the item "ITM-A" in the supplier "SUP001" is "30 days" in the supplier master information 121 in FIG. 2, the delivery expectation index calculation unit 112 calculates "72 days" acquired by subtracting "30 days" from "102 days". Then, the delivery expectation index calculation unit 112 temporarily stores, in the storage unit 120, the calculated number of days ("72 days") as a value of the interval index of the order ID "P001".

Next, the delivery expectation index calculation unit 112 calculates a quantity ratio index. Specifically, the delivery expectation index calculation unit 112 calculates, by using the order history information 122, a proportion of a change amount from a latest previous order quantity (an order quantity "50" of an order ID "P000") of the same item ("ITM-A") for the same supplier ("SUP001") to a current order quantity "10" (the order quantity "10" of the order ID "P001")=10/50. Note that, when a current order quantity is reduced from a latest previous order quantity, the delivery expectation index calculation unit 112 multiplies "−1" to provide a minus sign, and when the current order quantity is increased, the delivery expectation index calculation unit 112 does not multiply "−1". In the example, the delivery expectation index calculation unit 112 calculates 10/50×(−1)=−0.2 as a quantity ratio index, and temporarily stores the quantity ratio index in the storage unit 120.

Next, the delivery expectation index calculation unit 112 calculates a delivery expectation index in the order ID "P001" of the same item ("ITM-A") for the same supplier ("SUP001") by the following arithmetic expression.

delivery expectation index=(value of interval index)/
(value of quantity ratio index)     Arithmetic expression:

By substituting the value of the interval index and the quantity ratio index in the example into the arithmetic expression described above, the delivery expectation index of the order ID "P001" is 72/−0.2=−360.

Note that the arithmetic expression for calculating the delivery expectation index is not particularly limited, and may be an arithmetic expression in consideration of a relationship between a margin degree of a period from an order to a requested delivery deadline and a change amount from a latest previous order quantity to a current order quantity in the same supplier and the same item.

The delivery expectation index calculation unit 112 calculates a delivery rate of the order ID "P001". Specifically, the delivery expectation index calculation unit 112 determines a record 123*i* including the requested delivery deadline 123*e* and the delivery date 123*f* that match among records (records 123*i* and 123*j*) in which the corresponding order ID of the delivery history information 123 is registered. The delivery expectation index calculation unit 112 calculates, as a delivery rate of the order ID "P001", a proportion of a delivery quantity "3" to an order quantity "10" of the determined record 123*i*.

The delivery expectation index calculation unit 112 calculates, by a method similar to that described above, a delivery expectation index and a delivery rate for each order in a combination of the same supplier and the same item, and generates the delivery expectation index information 124 in which an order ID is registered in association with the delivery expectation index and the delivery rate.

Next, the order plan formulation unit 113 creates a delivery expectation index histogram (step S104). Specifically, the order plan formulation unit 113 generates the delivery expectation index histogram information 125 by using the delivery expectation index information 124, and creates a delivery expectation index histogram for each combination of the same supplier and the same item by using the delivery expectation index histogram information 125.

First, generation of the delivery expectation index histogram information 125 will be described. The order plan formulation unit 113 extracts an order ID from the delivery expectation index information 124, and determines, from the order history information 122, a supplier ID and an item ID that are associated with the extracted order ID.

The order plan formulation unit 113 divides, by a predetermined range width, a range that a delivery expectation index in the delivery expectation index information 124 may take, and calculates a delivery expectation index lower limit and a delivery expectation index upper limit. More specifically, the order plan formulation unit 113 sets a range between a minimum value and a maximum value of a delivery expectation index in the delivery expectation index information 124 as a range that the delivery expectation index may take, and divides the range by a predetermined range width (for example, by a width of 100).

For example, in the delivery expectation index information 124 in FIG. 5, a range between a minimum value "−360" and a maximum value "450" is a range that a delivery expectation index may take. When this range is divided by a range width "100", a range width of the delivery expectation index lower limit 125*c* and the delivery expectation index upper limit 125*d* is "−399" to "−300", "−299" to "−200", "−199" to "−100", "−99" to "0", "1" to "100", "101" to "200", and "201" to "300".

The order plan formulation unit 113 calculates the frequency 125*e*. Specifically, the order plan formulation unit 113 counts, as the frequency 125*e*, the number of the order ID 124*a* of the delivery expectation index information 124 associated with a delivery expectation index included between the calculated delivery expectation index lower limit 125*c* and the calculated delivery expectation index upper limit 125*d*.

For example, in the delivery expectation index information 124 in FIG. 5, a delivery expectation index of three order IDs ("P001", "P100", and "P120") falls between "−399" and "−300". Thus, the order plan formulation unit 113 registers a value "3" acquired by adding the number of the order IDs ("P001", "P100", and "P120") in the frequency 125*e* of the record associated with the delivery expectation index lower limit 125*c* and the delivery expectation index upper limit 125*d* of the range width.

The order plan formulation unit 113 calculates the average delivery rate 125*f*. Specifically, the order plan formulation unit 113 adds up the delivery rate 124*c* of the order ID of the delivery expectation index information 124 associated with a delivery expectation index included in each range width of the delivery expectation index lower limit 125*c* and the delivery expectation index upper limit 125*d*, divides the delivery rate 124*c* by a number of the frequency 125*e*, and thus calculates the average delivery rate 125*f* of each range width.

For example, in the delivery expectation index information 124 in FIG. 5, as described above, a value of the delivery expectation index of the three order IDs ("P001", "P100", and "P120") falls between "−399" and "−300". Thus, the order plan formulation unit 113 adds up delivery rates "30", "40", and "50" associated with the corresponding order IDs, divides the result of the addition by the frequency "3", and thus calculates an average delivery rate="40".

The order plan formulation unit 113 calculates, by a method similar to that described above, the frequency 125*e* and the average delivery rate 125*f* included in each range width of the delivery expectation index lower limit 125*c* and the delivery expectation index upper limit 125*d* in a combination of the same supplier and the same item. The order plan formulation unit 113 generates the delivery expectation index histogram information 125 in which the pieces of information are registered.

The order plan formulation unit 113 creates a delivery expectation index histogram by using the generated delivery expectation index histogram information 125.

Figure 10:
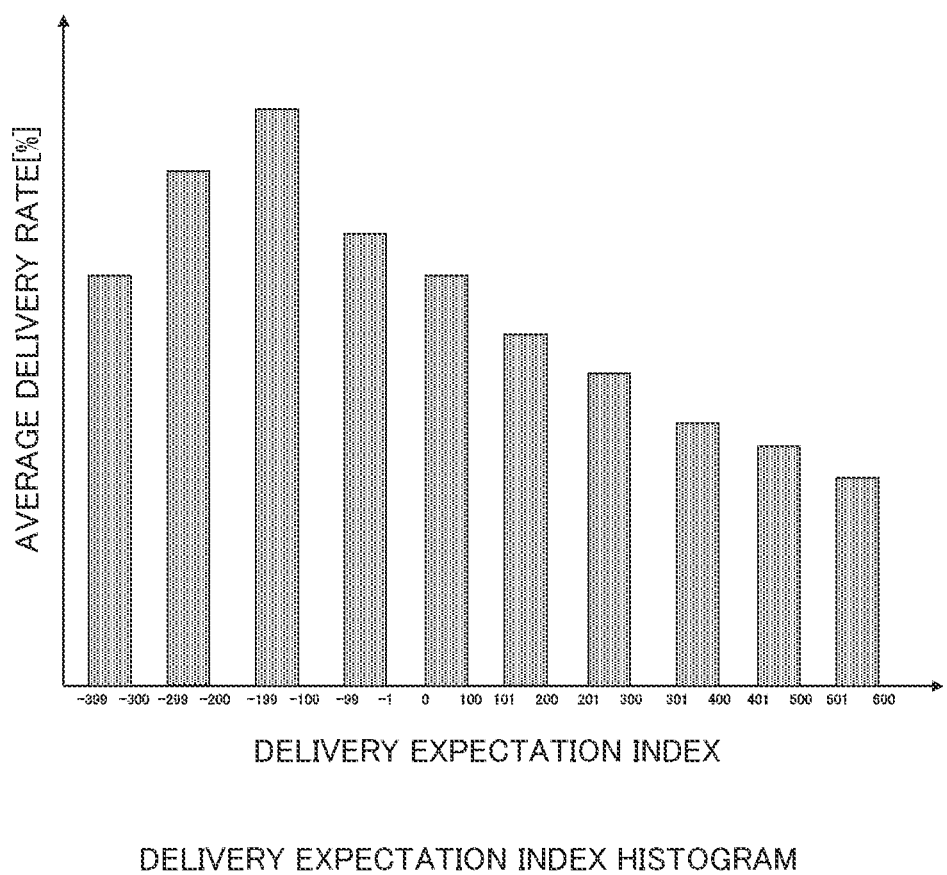
FIG. 10 is a view illustrating an example of a delivery expectation index histogram.

FIG. 10 is a view illustrating an example of a delivery expectation index histogram. The delivery expectation index histogram is a frequency distribution map indicating a relationship between a delivery expectation index and an average delivery rate at that time. Specifically, in the delivery expectation index histogram, an average delivery rate [%] is associated with a vertical axis, and a delivery expectation index is associated with a horizontal axis.

Each columnar graph visually indicates information in each record of the delivery expectation index histogram information 125. In other words, the columnar graph has a range width between the delivery expectation index lower limit 125*c* and the delivery expectation index upper limit 125*d* of each record, and a level of the average delivery rate 125*f* of a corresponding record is represented by the size of the vertical axis.

Next, the information reading unit 111 reads the procurement plan information 126 from the storage unit 120 (step S105).

Next, the order plan formulation unit 113 executes plan allocation (step S106). Specifically, the order plan formulation unit 113 generates production plan information by using the supplier master information 121, the order history information 122, the delivery history information 123, the procurement plan information 126, and the delivery expectation index histogram information 125.

First, the order plan formulation unit 113 calculates, via the delivery expectation index calculation unit 112, a delivery expectation index of the item ID 126a included in a predetermined number of a record of the procurement plan information 126. Specifically, the delivery expectation index calculation unit 112 extracts an item ID, a required date, and a quantity that are included in the record. The delivery expectation index calculation unit 112 determines, from the supplier master information 121, a supplier from which an item of the item ID can be procured and a procurement LT for each supplier.

The delivery expectation index calculation unit 112 calculates, by a method similar to that described above, a delivery expectation index for each supplier in an item of the record with the extracted required date as a requested delivery deadline and with, as an order date, a predetermined date such as the processing date or a date after several days.

Here, description is given by taking, as an example, a record 126d in the procurement plan information 126 in FIG. 7. First, the delivery expectation index calculation unit 112 extracts, from the procurement plan information 126, an item ID "ITM-A", a required date "2018 Jul. 1", and a quantity "70", and sets a predetermined date "2018 Oct. 1" as an order date.

The delivery expectation index calculation unit 112 determines, from the supplier master information 121, a supplier ("A Kogyo" and "B Seiko") from which the item ID "ITM-A" can be procured and a procurement LT ("30 days" and "7 days") for each supplier.

The delivery expectation index calculation unit 112 calculates an interval index and a quantity ratio index by using the order history information 122. Specifically, the delivery expectation index calculation unit 112 calculates an interval index for each supplier by subtracting the procurement LT ("30 days" and "7 days") of the item ID "ITM-A" from the number of days acquired by subtracting the predetermined date "2018 Oct. 1" from the required date "2018 Jul. 10".

The order plan formulation unit 113 calculates, by using the order history information 122, a change amount from a latest previous order quantity of the item ID "ITM-A" to a current order quantity similarly to the manner described above. Since the latest previous order quantity of the item ID "ITM-A" is "100" on "2018 Jun. 20", the delivery expectation index calculation unit 112 calculates $70/100 \times (-1) = -0.7$.

The delivery expectation index calculation unit 112 calculates, by using the calculated interval index and the calculated quantity ratio index, a delivery expectation index for each supplier by using the arithmetic expression described above.

Next, the order plan formulation unit 113 determines, from the delivery expectation index histogram information 125, a record having the same combination as the combination of the item ID and the supplier of the calculated delivery expectation index. The order plan formulation unit 113 generates a delivery expectation index histogram by using the determined record of the delivery expectation index histogram information 125, and determines an average delivery rate associated with a range width including the calculated delivery expectation index.

The order plan formulation unit 113 determines an average delivery rate of the item ID for each supplier, and selects a supplier having the highest average delivery rate. Note that, for example, when there are a plurality of suppliers having the same average delivery rate, the order plan formulation unit 113 may select a supplier having a shorter procurement LT.

The order plan formulation unit 113 performs similar processing on all records of the procurement plan information 126, and determines a supplier having a high average delivery rate for each item being a procurement target.

The order plan formulation unit 113 generates the order plan information 127 in which an item ID of the procurement plan information 126, a requested delivery deadline corresponding to a required date, a quantity, a supplier ID of a supplier determined for each item ID, and an average delivery rate of the supplier and the item are associated with one another, stores the order plan information 127 in the storage unit 120, and terminates the processing of the flow.

The order plan formulation unit 113 generates, via the display information generation unit 114, screen information (for example, screen information about an order plan confirmation screen described below) for displaying the generated order plan information 127 on the user terminal device 200. The order plan formulation unit 113 transmits the generated screen information to the user terminal device 200 via the communication unit 130.

FIG. 11 is a view illustrating an example of an order plan confirmation screen 300 displayed on the user terminal device 200. On the screen 300, a supplier 301, an item 302, an estimated delivery deadline compliance rate (overall) 303, and recommended order information 304 are displayed.

Here, the recommended order information 304 includes a table 305 in which a recommended order date, a requested delivery deadline, a quantity, and an estimated delivery deadline compliance rate are associated with one another. The recommended order date of each record is a date acquired by subtracting, from the requested delivery deadline, a procurement lead time of the supplier 301 and the item 302 that are selected on the screen 300. Note that the recommended order date may be, for example, an execution date of order plan formulation processing (for example, a date on which the processing in step S106 is executed or the predetermined date described above). The requested delivery deadline and the quantity of each record correspond to the requested delivery deadline 127c and the quantity 127d of the order plan information 127, respectively. The recommended delivery deadline compliance rate of each record corresponds to an average delivery rate determined from a delivery expectation index histogram (the average delivery rate 127e registered in the order plan information 127). The recommended delivery deadline compliance rate (overall) 303 is an average value of the recommended delivery deadline compliance rate for each record.

The input reception unit 201 of the user terminal device 200 receives, via the input device, a user selection of the supplier 301 and the item 302 from a pull-down button in the order plan confirmation screen 300. In this case, the display unit 202 displays the recommended order information 304 and the estimated delivery deadline compliance rate (overall) 303 that are associated with the selected supplier or the selected item.

Note that a configuration of the screen 300 displayed on the user terminal device 200 is not particularly limited to that illustrated in FIG. 11. For example, screen information that displays all contents of the order plan information 127 may be used. Alternatively, only a supplier having a high average delivery rate for each item may be displayed based on the order plan information 127.

Since such screen 300 is displayed on the user terminal device 200, a user can confirm a supplier having a higher delivery rate even when a supplier being an order destination handles a wide variety of many items, and the user can also place an order on a date nearer to a required date of a procurement plan.

The procurement work assistance system 1000 according to the first embodiment has been described above. Such procurement work assistance system 1000 can determine a supplier having a high delivery rate of a procurement item, based on a delivery expectation index in consideration of a margin of an interval of days from an order date to a requested delivery deadline, and a change amount of an order number. Thus, an optimum supplier that satisfies a procurement plan can be selected.

Second Embodiment

Figure 12:
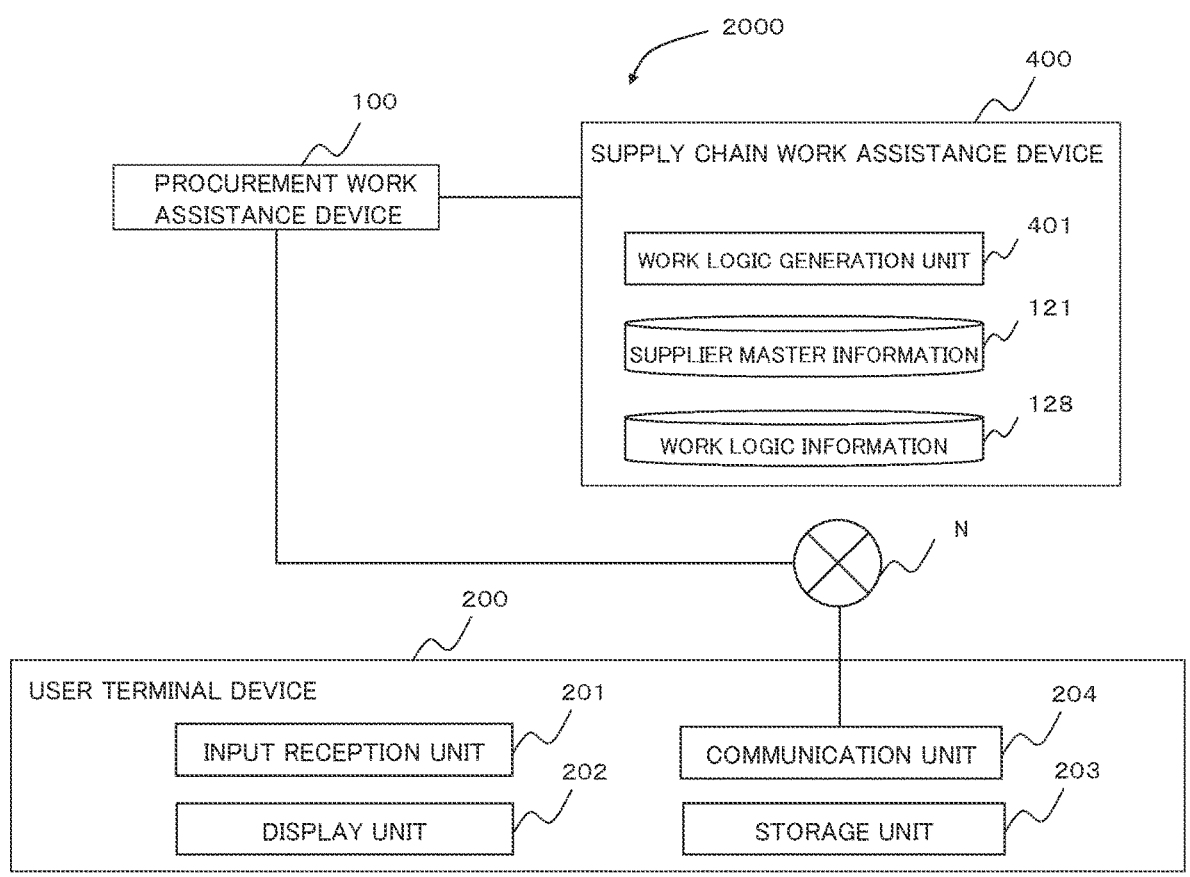
FIG. 12 is a view illustrating an example of a schematic configuration of a procurement work assistance system according to a second embodiment.

A procurement work assistance system 2000 according to a second embodiment regenerates procurement plan information 126 in consideration of market conditions of a supply chain, and performs order plan generation processing by using the regenerated procurement plan information 126. FIG. 12 is a view illustrating an example of a schematic configuration of the procurement work assistance system 2000 according to the second embodiment. As illustrated, the procurement work assistance system 2000 includes the procurement work assistance device 100, a supply chain work assistance device 400, and a user terminal device 200. Note that a configuration different from the procurement work assistance system 1000 according to the first embodiment will be mainly described below, and description of the same configuration will be omitted.

The supply chain work assistance device 400 is a device that performs information processing related to various types of work in a supply chain in consideration of market conditions of the supply chain. For example, the supply chain work assistance device 400 generates work logic information being optimum for generating the procurement plan information 126 in consideration of market conditions of a supply chain, and transmits the work logic information to the procurement work assistance device 100.

Specifically, the supply chain work assistance device 400 includes a work logic generation unit 401, supplier master information 121, and work logic information 128. The work logic generation unit 401 generates, by using predetermined information such as the supplier master information 121, the work logic information 128 being optimum for generating the procurement plan information 126. Note that, for a method for generating the work logic information 128, a technique disclosed in JP 2018-063598 A is assumed to be used. The work logic generation unit 401 transmits the generated work logic information 128 to the procurement work assistance device 100 via a communication unit (not illustrated).

FIG. 13 is a view illustrating an example of a data configuration of the work logic information 128. The work logic information 128 is information used for generating the procurement plan information 126. Specifically, the work logic information 128 includes a record in which a work logic ID 128*a*, a logic name 128*b*, and a use flag 128*c* are associated with one another. Note that the work logic ID 128*a* is information that uniquely identifies a kind of a work logic. The logic name 128*b* is information indicating a name of a work logic determined by the corresponding work logic ID 128*a*. Note that the work logic includes a work logic related to various order methods such as a "periodic ordering method", a "fixed quantity ordering method", and a "fixed quantity maintaining method". The use flag 128*c* is flag information indicating, by "0" or "1", whether a work logic needs to be used when market conditions of a supply chain are considered. "1" is associated with a work logic needed to be used according to market conditions of a supply chain.

Referring back to FIG. 12, description is given. An arithmetic unit 110 of the procurement work assistance device 100 further includes a work logic execution unit 115 for regenerating the procurement plan information 126 by using the work logic information 128 acquired from the supply chain work assistance device 400. Note that the work logic information 128 acquired from the supply chain work assistance device 400 is stored in a storage unit 120. The procurement work assistance device 100 and the supply chain work assistance device 400 are connected to each other so as to enable wired communication or wireless communication via a communication bus or a network such as the Internet.

Figure 14:
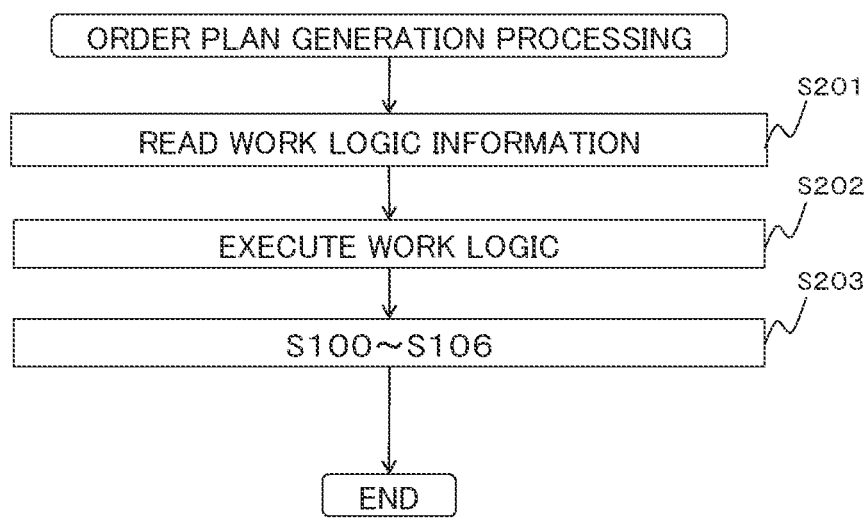
FIG. 14 is a flow diagram illustrating an example of order plan generation processing according to the second embodiment.

FIG. 14 is a flowchart illustrating an example of the order plan generation processing performed by the procurement work assistance device 100 according to the present embodiment. Note that step S203 corresponds to step S100 to step S106 in the order plan generation processing according to the first embodiment, and thus detailed description will be omitted.

When the processing starts, an information reading unit 111 reads the work logic information 128 from the storage unit 120 (step S201). Next, the work logic execution unit 115 executes a work logic by using the read work logic information 128, and regenerates new procurement plan information 126 in consideration of market conditions of a supply chain by using the procurement plan information 126 stored in advance in the storage unit 120 (step S202). Specifically, the work logic execution unit 115 determines, from the work logic ID 128*a* or the logic name 128*b*, a work logic in which "1" is associated with a use flag of the work logic information 128. Since a use flag associated with the work logic of the periodic ordering method is "1" in FIG. 13, the work logic execution unit 115 regenerates the procurement plan information 126, based on the periodic ordering method.

Specifically, the work logic execution unit 115 changes a required date of the procurement plan information 126 to a preset nearest periodic delivery date (for example, 2018 Jul. 15). The work logic execution unit 115 changes a quantity of the same item to a total quantity.

Next, the order plan formulation unit 113 of the procurement work assistance device 100 performs the processing in step S203 (step S100 to step S106 described above) by using the procurement plan information 126 regenerated in such a manner.

The procurement work assistance system 2000 according to the second embodiment has been described above. Such procurement work assistance system 2000 can regenerate the procurement plan information 126 in consideration of market conditions of a supply chain. Particularly, in the procurement work assistance system 2000 according to the present embodiment, the supply chain work assistance device 400 determines an optimum work logic according to market conditions of a supply chain. Thus, the procurement plan information 126 can be regenerated by using a work logic in consideration of a restriction of a warehouse, a transportation lead time of a product, and the like in a supply chain, for example, and thus an order plan that further follows an actual condition can be formulated.

Hereinafter, an example of a hardware configuration of the procurement work assistance device 100, the user terminal device 200, and the supply chain work assistance device 400 will be described.

Figure 15:
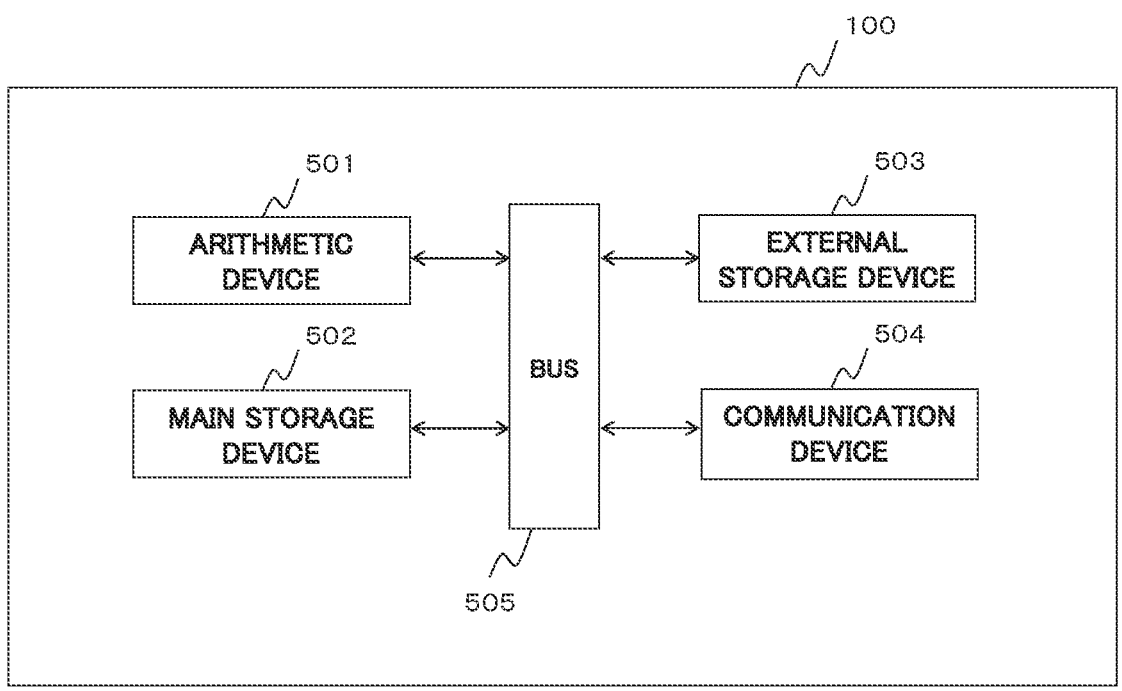
FIG. 15 is a view illustrating an example of a hardware configuration of a procurement work assistance device.

FIG. 15 is a view illustrating an example of the hardware configuration of the procurement work assistance device 100. The procurement work assistance device 100 is achieved by a high-performance information processing device such as a server device, for example.

As illustrated, the procurement work assistance device 100 includes an arithmetic device 501, a main storage device 502, an external storage device 503, a communication device 504, and a bus 505 that electrically connects these to one another.

The arithmetic device 501 is, for example, a central processing unit (CPU). The main storage device 502 is a memory device such as a random access memory (RAM) and a read only memory (ROM).

The external storage device 503 is a nonvolatile storage device such as a hard disk drive, a solid state drive (SSD), or a flash memory that can store digital information.

The communication device 504 is a wired communication device that performs wired communication via a network cable, or a wireless communication device that performs wireless communication via an antenna. The communication device 504 performs information communication with an external device connected to a network.

An example of the hardware configuration of the procurement work assistance device 100 has been described above. Note that the supply chain work assistance device 400 may have the hardware configuration similar to that of the procurement work assistance device 100.

Figure 16:
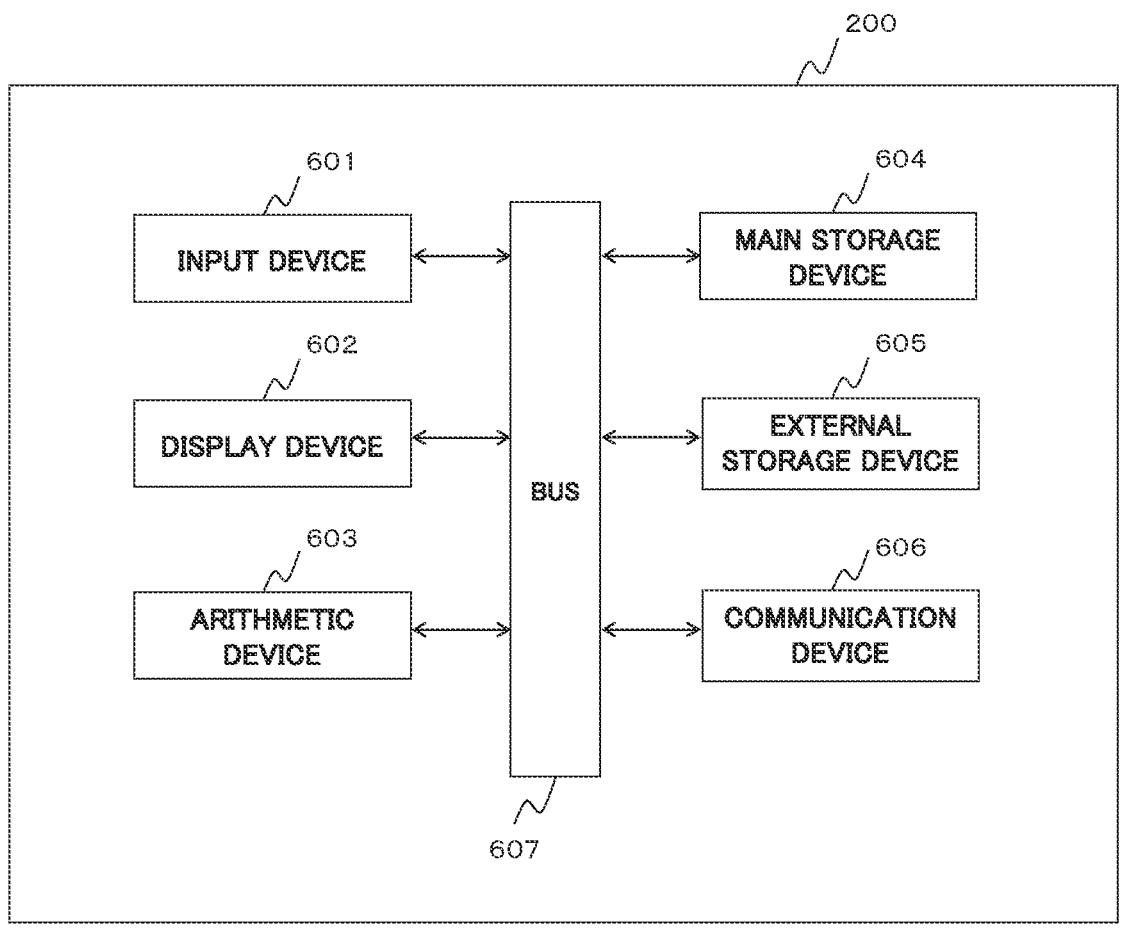
FIG. 16 is a view illustrating an example of a hardware configuration of a user terminal device.

FIG. 16 is a view illustrating an example of the hardware configuration of the user terminal device 200. The user terminal device 200 is an information processing device such as a personal computer, for example.

As illustrated, the user terminal device 200 includes an input device 601, a display device 602, an arithmetic device 603, a main storage device 604, an external storage device 605, a communication device 606, and a bus 607 that electrically connects these to one another.

The input device 601 is a keyboard or a pointing device such as a mouse and a touch panel. The display device 602 is, for example, a liquid crystal display, an organic display, and the like.

The arithmetic device 603 is, for example, CPU. The main storage device 604 is a memory device such as RAM and ROM. The external storage device 605 is a nonvolatile storage device such as a hard disk drive, an SSD, or a flash memory that can store digital information.

The communication device 606 is a wired communication device that performs wired communication via a network cable, or a wireless communication device that performs wireless communication via an antenna. The communication device 606 performs information communication with an external device connected to a network.

Note that the arithmetic unit 110 of the procurement work assistance device 100 is achieved by a program causing the arithmetic device 501 to perform processing. This program is stored in the main storage device 502 or the external storage device 503, is loaded onto the main storage device 502 for execution of the program, and is executed by the arithmetic device 501. The storage unit 120 is achieved by the main storage device 502, the external storage device 503, or a combination of these. A communication unit 130 is achieved by the communication device 504.

An input reception unit 201 and a display unit 202 of the user terminal device 200 are achieved by a program causing the arithmetic device 603 to perform processing. This program is stored in the main storage device 604 or the external storage device 605, is loaded onto the main storage device 604 for execution of the program, and is executed by the arithmetic device 603. The storage unit 203 is achieved by the main storage device 604, the external storage device 605, or a combination of these. The communication unit 204 is achieved by the communication device 606.

A part or an entirety of each configuration, function, processing unit, processing means, and the like described above of the procurement work assistance device 100, the user terminal device 200, and the supply chain work assistance device 400 may be implemented with hardware by, for example, designing of an integrated circuit. The configuration and the function described above may be implemented with software by a processor that reads and executes a program achieving each function. Information on a program, a table, a file, and the like that achieve each function may be stored in a storage device such as a memory, a hard disk, and an SSD or a recording medium such as an IC card, an SD card, and a DVD.

The present invention is not limited to the example embodiments described above, and includes various modification examples. For example, the example embodiments described above are described in detail for the sake of better understanding of the present invention, and the present invention is not necessarily limited to including all the configurations described herein. It is possible to replace a part of a configuration of one example embodiment with a configuration of another example embodiment. It is also possible to add a configuration of one example embodiment to a configuration of another example embodiment. It is possible to add, eliminate, and replace a part of a configuration of each example embodiment with respect to another configuration.

Illustrations of control lines and information lines in the description above are those considered to be necessary for the sake of description, and not necessarily include all the control lines and information lines necessary as a product. In actuality, it may be considered that substantially all the configurations are connected to one another.

REFERENCE SIGNS LIST 1000, (2000) Procurement work assistance system
100 Procurement work assistance device
110 Arithmetic unit
111 Information reading unit
112 Delivery expectation index calculation unit
113 Order plan formulation unit
114 Display information generation unit
115 Work logic execution unit
120 Storage unit
121 Supplier master information
122 Order history information
123 Delivery history information
124 Delivery expectation index information
125 Delivery expectation index histogram information
126 Procurement plan information
127 Order plan information
128 Work logic information
130 Communication unit
200 User terminal device
201 Input reception unit
202 Display unit
203 Storage unit
204 Communication unit
501 Arithmetic device
502 Main storage device
503 External storage device 504 Communication device
505 Bus
601 Input device
602 Display device
603 Arithmetic device
604 Main storage device
605 External storage device
606 Communication device
607 Bus
N Network

What is claimed is:

1. A procurement work assistance system comprising:
a procurement work assistance device; and
a user terminal device,
wherein the procurement work assistance device includes a first computer configured to:
store:
order history information including a plurality of entries indicating a past order history, each entry including an order identification (ID), an item ID and a supplier ID stored in associated with each other,
delivery history information including a plurality of entries indicating a delivery history, each entry including the order ID, the supplier ID, the supplier ID, a delivery date, an order quantity and a delivered quantity, and
a procurement plan in which an item to be procured is registered,
calculate for each order ID, by using the order history information, a delivery expectation index of delivery for each item of each supplier,
calculate a delivery rate for each order ID, the delivery rate being a proportion based on the order quantity and the delivered quantity,
generate delivery expectation index histogram information by determining which predetermined range, of a plurality of predetermined ranges of the histogram, each delivery expectation index falls into, the plurality of predetermined ranges having a lowest range and a highest range determined based on a minimum and a maximum delivery expectation index, respectively, among the delivery expectation indexes of all the order IDs,
calculate, for each predetermined range, the average delivery rate associated with each of the delivery expectations indexes falling within the respective predetermined range,
determine, by using the delivery expectation index histogram information, the supplier having the highest average delivery rate associated with the delivery expectation index,
generate order plan information based on the supplier having the highest average delivery rate and, transmit predetermined screen information including the generated order plan to the user terminal device, and
wherein the user terminal device includes a second computer coupled to a display, the second computer being configured to display the screen information.

2. The procurement work assistance system according to claim 1,
wherein the delivery expectation index is calculated based on a relationship between an interval of days from an order date to a delivery deadline, and a change amount from a previous order to a current order.

3. The procurement work assistance system according to claim 1,
wherein the order plan information includes the determined supplier, an item, a delivery deadline and a quantity of the item, and an average delivery rate of the supplier and the item.

4. A procurement work assistance device comprising:
a computer configured to:
store:
order history information including a plurality of entries indicating a past order history, each entry including an order identification (ID), an item ID and a supplier ID stored in associated with each other,
delivery history information including a plurality of entries indicating a delivery history, each entry including the order ID, the supplier ID, the supplier ID, a delivery date, an order quantity and a delivered quantity, and
a procurement plan in which an item to be procured is registered, calculate for each order ID, by using the order history information, a delivery expectation index of delivery for each item of each supplier,
calculate a delivery rate for each order ID, the delivery rate being a proportion based on the order quantity and the delivered quantity,
generate delivery expectation index histogram information by determining which predetermined range, of a plurality of predetermined ranges of the histogram, each delivery expectation index falls into, the plurality of predetermined ranges having a lowest range and a highest range determined based on a minimum and a maximum delivery expectation index, respectively, among the delivery expectation indexes of all the order IDs,
calculate, for each predetermined range, the average delivery rate associated with each of the delivery expectations indexes falling within the respective predetermined range,
determine, by using the delivery expectation index histogram information, the supplier having the highest average delivery rate associated with the delivery expectation index, and
generate order plan information based on the supplier having the highest average delivery rate and, transmit predetermined screen information including the generated order plan to a user terminal device.

5. The procurement work assistance device according to claim 4,
wherein the delivery expectation index is calculated based on a relationship between an interval of days from an order date to a delivery deadline, and a change amount from a previous order to a current order.

6. The procurement work assistance device according to claim 4,
wherein the order plan information includes the determined supplier, an item, a delivery deadline and a quantity of the item, and an average delivery rate of the supplier and the item.

7. A procurement work assistance method performed by a procurement work assistance device, the procurement work assistance method comprising:
storing:
order history information including a plurality of entries indicating a past order history, each entry including an order identification (ID), an item ID and a supplier ID stored in associated with each other,
delivery history information including a plurality of entries indicating a delivery history, each entry including the order ID, the supplier ID, the supplier ID, a delivery date, an order quantity and a delivered quantity, and a procurement plan in which an item to be procured is registered;

calculating for each order ID, by using the order history information, a delivery expectation index of delivery for each item of each supplier;

calculating a delivery rate for each order ID, the delivery rate being a proportion based on the order quantity and the delivered quantity;

generating delivery expectation index histogram information by determining which predetermined range, of a plurality of predetermined ranges of the histogram, each delivery expectation index falls into, the plurality of predetermined ranges having a lowest range and a highest range determined based on a minimum and a maximum delivery expectation index, respectively, among the delivery expectation indexes of all the order IDs;

calculating, for each predetermined range, the average delivery rate associated with each of the delivery expectations indexes falling within the respective predetermined range;

determining, by using the delivery expectation index histogram information, the supplier having the highest average delivery rate associated with the delivery expectation index; and generating order plan information based on the supplier having the highest average delivery rate and, transmit predetermined screen information including the generated order plan to a user terminal device.

8. The procurement work assistance method according to claim 7, wherein the delivery expectation index is calculated based on a relationship between an interval of days from an order date to a delivery deadline, and a change amount from a previous order to a current order.

9. The procurement work assistance device according to claim 7, wherein the order plan information includes the determined supplier, an item, a delivery deadline and a quantity of the item, and an average delivery rate of the supplier and the item.

* * * * *